United States Patent [19]

Sanders et al.

[11] 4,212,535
[45] Jul. 15, 1980

[54] ULTRAVIOLET RADIATION DOSIMETER

[75] Inventors: Corey L. Sanders; David M. Makow, both of Ottawa, Canada

[73] Assignee: Canadian Patents & Development Ltd., Ottawa, Canada

[21] Appl. No.: 937,800

[22] Filed: Aug. 29, 1978

[30] Foreign Application Priority Data

Nov. 2, 1977 [CA] Canada ................................. 290110

[51] Int. Cl.$^2$ ............................................. G01J 1/46
[52] U.S. Cl. ..................................... 356/51; 356/215; 250/372
[58] Field of Search ................... 356/51, 215; 250/372

[56] References Cited

U.S. PATENT DOCUMENTS

| 2,949,880 | 8/1960 | Fromer | 356/215 |
| 3,655,971 | 4/1972 | Haas et al. | 250/474 |
| 3,779,651 | 12/1973 | Gunlock | 356/215 |

Primary Examiner—Vincent P. McGraw
Attorney, Agent, or Firm—J. R. Hughes

[57] ABSTRACT

A method for detecting, monitoring or measuring visible and ultraviolet radiation exposure wherein a liquid crystal element covered with a coating layer transparent to the radiation is placed in the path of the radiation to be monitored and then the shift of the spectral reflectance or transmittance of the element is measured, this shift being a measure of the radiation dosage. This shift may be measured using reference liquid crystal elements or a spectrophotometer or similar measuring devices.

2 Claims, 1 Drawing Figure

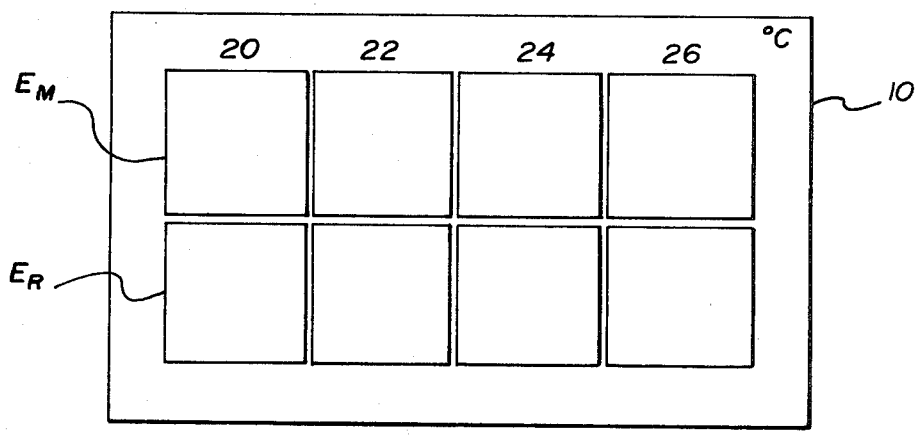

ULTRAVIOLET RADIATION DOSIMETER

This invention relates to a method and apparatus using liquid crystals for indicating and measuring the exposure of objects to radiation especially ultraviolet light radiation.

Liquid crystals have recently found widespread application for a variety of uses most especially as temperature indicators. A heat sensitive novelty device is described in U.S. Pat. No. 3,802,945 issued Apr. 9, 1974 to B. G. James. Another use for liquid crystals has been an imaging system using ultraviolet radiation. Examples of this are described in U.S. Pat. No. 3,655,971 issued Apr. 11, 1972 to W. E. L. Haas et al and U.S. Pat. No.: 3,804,618 issued Apr. 16, 1972 to E. Forest et al.

The present invention is concerned with an apparatus to record and/or evaluate the exposure (temporally integrated irradiation) of objects to ultraviolet (U.V.) radiation e.g. human skin to erythemal exposure, dairy products to changes in quality by U.V., art objects by fading from U.V. exposure and damage to conjunctiva from exposure to welding arcs. There are several methods in use at the present time to measure exposure to radiation. These include: (1) by observing the color change of fading standards such as plastics, wools, papers. (2) by measuring the U.V. radiation at intervals and integrating. (3) by using an actinometer and (4) by spectral weighted integration and temporal integration. These all have certain drawbacks, e.g. wool standards are not sensitive enough for use in protecting sensitive materials and the other methods require bulky and expensive equipment. Another method of monitoring radiation exposure is described in a paper entitled "Possible dosimeter for ultraviolet radiation" by A. Davis, G. H. W. Deane and B. L. Biffey in Nature Vol. 261, May 13, 1976. This paper suggests the use of certain plastics i.e. polysulphone and polyphenylene oxides for ultraviolet dosimeters.

It is an object of the present invention to provide a method and apparatus for detecting, monitoring, and measuring U.V. radiation exposure amounts or doses.

This and other objects of the invention are achieved by method for detecting, monitoring or measuring visible and ultraviolet radiation exposure wherein a liquid crystal element covered with a coating layer transparent to the radiation is placed in the path of the radiation to be monitored and then the shift of the spectral reflectance or transmittance of the element is measured, this shift being a measure of the radiation dosage. This shift may be measured using reference liquid crystal elements or a spectrophotometer or similar measuring devices.

This and other objects of the invention are also achieved by a device incorporating at least one liquid crystal element for positioning in the path of the radiation to be monitored and at least one similar liquid crystal element located at an adjacent position and covered with a mask impervious to the radiation being monitored for references purposes. This is a preferred version when the liquid crystal used is of a variety that is not temperature dependent. In another oreferred version, the device is made up of several pairs of elements to cover a temperature range, if the liquid crystal is temperature sensitive. This version can be used as a temperature indicator at the same time.

The single drawing illustrates a radiation monitoring device with four pairs of elements.

It is well known that liquid crystal materials exhibit color changes at certain temperature levels with the color change temperature point being characteristic of the specific type of liquid crystal. It has been found that lqiuid crystals are sensitive to visible and ultraviolet radiation with the color change temperature point changing (lowering) with radiation amount or dosage. This change, although not directly linear with radiation dosage, can be measured and by means of a calibrated standard, a useful monitor is achieved.

Referring to the figure, a monitor made up of four pairs of elements is shown mounted on a suitable card or plate 10. The elements on the upper row marked $E_M$ are the monitoring elements and those on the lower row marked $E_R$ are for reference purposes. Although only one pair of elements is needed if the device is used at a certain temperature or if it is made up of a temperature insensitive liquid crystal, four pairs are used here for the device working in a range 20°–26° C. The monitoring elements are chosen to function at these temperatures. Each reference element is normally of the same liquid crystal material as its mate in the pair and is covered with a masking material to shield it from the radiation being monitored. The monitoring elements are also covered with a thin coating but not containing a U.V. absorber. The simplest method of calibration is to pre-expose calibration elements until the color change occurs and then subsequent exposure of the monitoring element will be equal to the pre-exposure when the two elements reach the same color. A graded series of calibration references of course can be set-up by varied amounts of pre-exposure.

The liquid crystal coatings are deposited on a black coated substrate if the wavelength of the reflected radiation is to be an indicator of the shift or they are deposited on a transparent sub strate if the wavelength of the transmitting radiation is the indicator of the shift.

These devices may be used by sunbathers or persons wishing to receive a suntan. The U.V. exposure required to produce a minimum erythemal response on the untanned human skin is more than that required to produce a visible change in the color of the liquid crystal. The liquid crystal device may be used to predict and thus prevent the resultant sunburn. It can also be used to monitor the U.V. exposure during suntanning which is required for health purposes. They can be used in househould situations to predict fading of drapes, carpets or furniture and in museums to predict damage to art objects. They could be used to assist in the measurement of the resistance to fading of materials by measuring the exposure which the materials receive before changing color or physical or chemical characteristics. They can be used to predict spoilage of butter and milk. They can be used to indicate that the exposure to welding arcs and other sources of U.V. may be damaging to the eyes of the skin.

The wavelength region where the liquid crystal is most sensitive to modification is in the U.V. but there is also sensitivity in the visible, but at a lower level.

The relative spectral sensititivy can be altered by coating the samples by spectrally selective absorbing materials. The radiation sensitivity can be altered by covering both the monitoring and reference samples by additional nonselective U.V. absorbers.

We claim:

1. A device for detecting, monitoring and measuring visible and ultraviolet radiation exposures or doses comprising at least one first liquid crystal element mounted on a card or plate for positioning in the path of the radiation to be monitored and at least one second liquid crystal element mounted adjacent the first element, said first element covered with a coating layer transparent to radiation, said second element masked or covered with a coating layer impervious to all or part of the radiation and having been pre-exposed to radiation of the kind being measured to cause a color change, the amount of the radiation pre-exposure having been determined and being a measure of the amount of radiation the first liquid crystal element receives when a color change occurs which brings the two colors into a color match condition.

2. A device for detecting, monitoring or measuring visible and ultraviolet radiation exposure or doses comprising at least one first liquid crystal element mounted on a card or plate for positioning in the path of the radiation to be monitored and at least one second liquid crystal element mounted adjacent the first element, said first element covered with a coating layer transparent to radiation, said second element masked or covered with a coating layer impervious to all or part of the radiation such that a noticeable color change of the first element as compared to the second indicates an amount of radiation having been received.

* * * * *